United States Patent
Wu et al.

(10) Patent No.: US 7,376,342 B2
(45) Date of Patent: May 20, 2008

(54) METHOD OF DETERMINING DISC TYPE FOR DISC BURNERS

(75) Inventors: Guo-Zua Wu, Hsinchu (TW); Chien-Hsin Huang, Hsinchu (TW); Jian-Ru Li, Hsinchu (TW); Zu-Wen Chao, Hsinchu (TW); Der-Ray Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 763 days.

(21) Appl. No.: 10/838,251

(22) Filed: May 5, 2004

(65) Prior Publication Data

US 2005/0141883 A1    Jun. 30, 2005

(30) Foreign Application Priority Data

Dec. 26, 2003   (TW)   .............................. 92137229 A

(51) Int. Cl.
*H04N 5/00* (2006.01)
(52) U.S. Cl. .................... 386/125; 386/126; 369/53.22
(58) Field of Classification Search ............... 386/125, 386/126; 369/53.22
See application file for complete search history.

(56) References Cited

U.S. PATENT DOCUMENTS

2003/0002417 A1* 1/2003 Takeshi .................. 369/59.13
2004/0193947 A1* 9/2004 Park et al. .................... 714/6

* cited by examiner

*Primary Examiner*—Thai Q. Tran
*Assistant Examiner*—Girumsew Wendmagegn
(74) *Attorney, Agent, or Firm*—Birch, Stewart, Kolasch & Birch, LLP

(57) ABSTRACT

This specification disclosed a method of determining the disc type for a disc burner to determine the type of an unfinalized disc. By checking the special bit data in the first and second tracks, the discs can be classified into different types. This avoids the trouble of manually keeping track of the type of each disc.

14 Claims, 3 Drawing Sheets

METHOD OF DETERMINING DISC TYPE FOR DISC BURNERS

This Non-provisional application claims priority under 35 U.S.C. § 119(a) on Patent Application No(s). 092137229 filed in TAIWAN on Dec. 26, 2003, the entire contents of which are hereby incorporated by reference.

BACKGROUND OF THE INVENTION

1. Field of Invention

The invention relates to a method of determining the type of a disc for a disc burner to determine the type of an unfinalized disc. In particular, it is a method that automatically determines the disc type in a disc burner.

2. Related Art

As more disc burners are available at affordable prices, recorable compact disc (CD-R) and rewritable compact disc (CD-RW) have become the primary storage media in the industry. According to different types of data recorded on the discs, the optical discs can be roughly classified into "Compact Disc_Digital Audio"(CD-DA), "Video Compact Discs" (VCD), "Super Video Compact Discs" (SVCD) and "MP3 Compact Disc" (MP3_CD).

As an optical disc has a large storage capacity, not all of it will be used at once. However, it cannot be re-used once it is burned. This is a waste, which greatly restricts the applications of the discs. Therefore, both the burner and burning program have the design of unfinalization processing. In other words, after an optical disc is burned, one can use the unfinalization processing to temporarily terminate the burning process. The rest space can be saved for the next burning.

However, this method faces a problem. That is, the burner has to know what type of data have been recorded on the unfinalized disc before the new burning process. The burner itself cannot automatically determine the original data type. Therefore, it relies on the user's manual input. This is a trouble for the user because the user has to keep track of the type of each unfinalized disc; otherwise, incorrect information may result in errors in the disc.

SUMMARY OF THE INVENTION

In view of the foregoing, the invention provides a method of determining the type of a disc for a disc burner to automatically determine the data type on a disc, assuring the type consistency on a burned disc.

The disclosed method first determines whether a disc inserted into a burner is an unfinalized disc. If it is an unfinalized disc, it further checks the data stored in its first track, classifying discs into two categories. The special bit data in the sector 31 of the second track are then used to read out the detailed type. Therefore, the invention can effectively determine the type of an unfinalized disc, preventing the problem of error reading after further burning.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
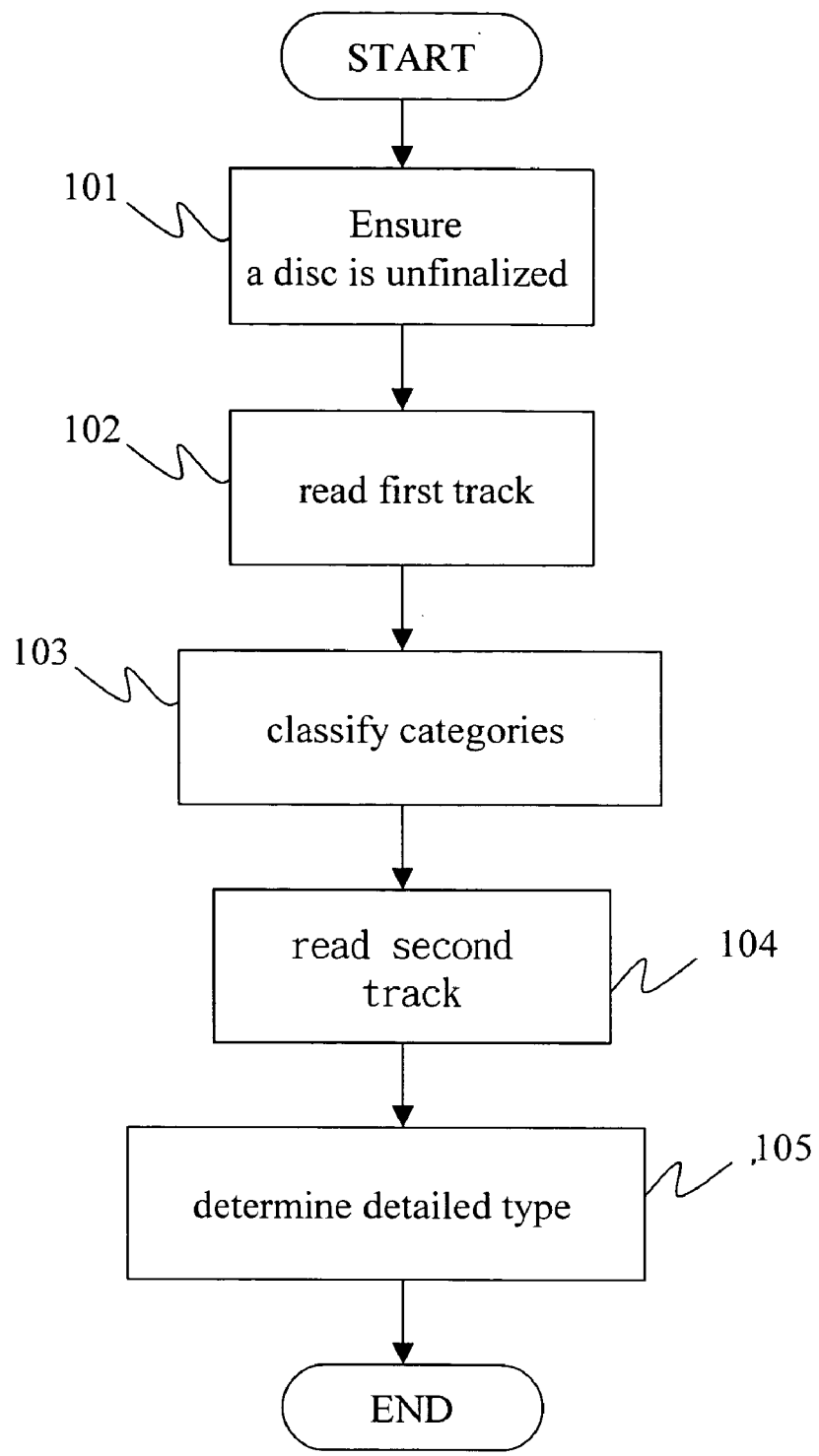
FIG. 1 is a schematic view of detailed steps in the disclosed method.
Figure 2:
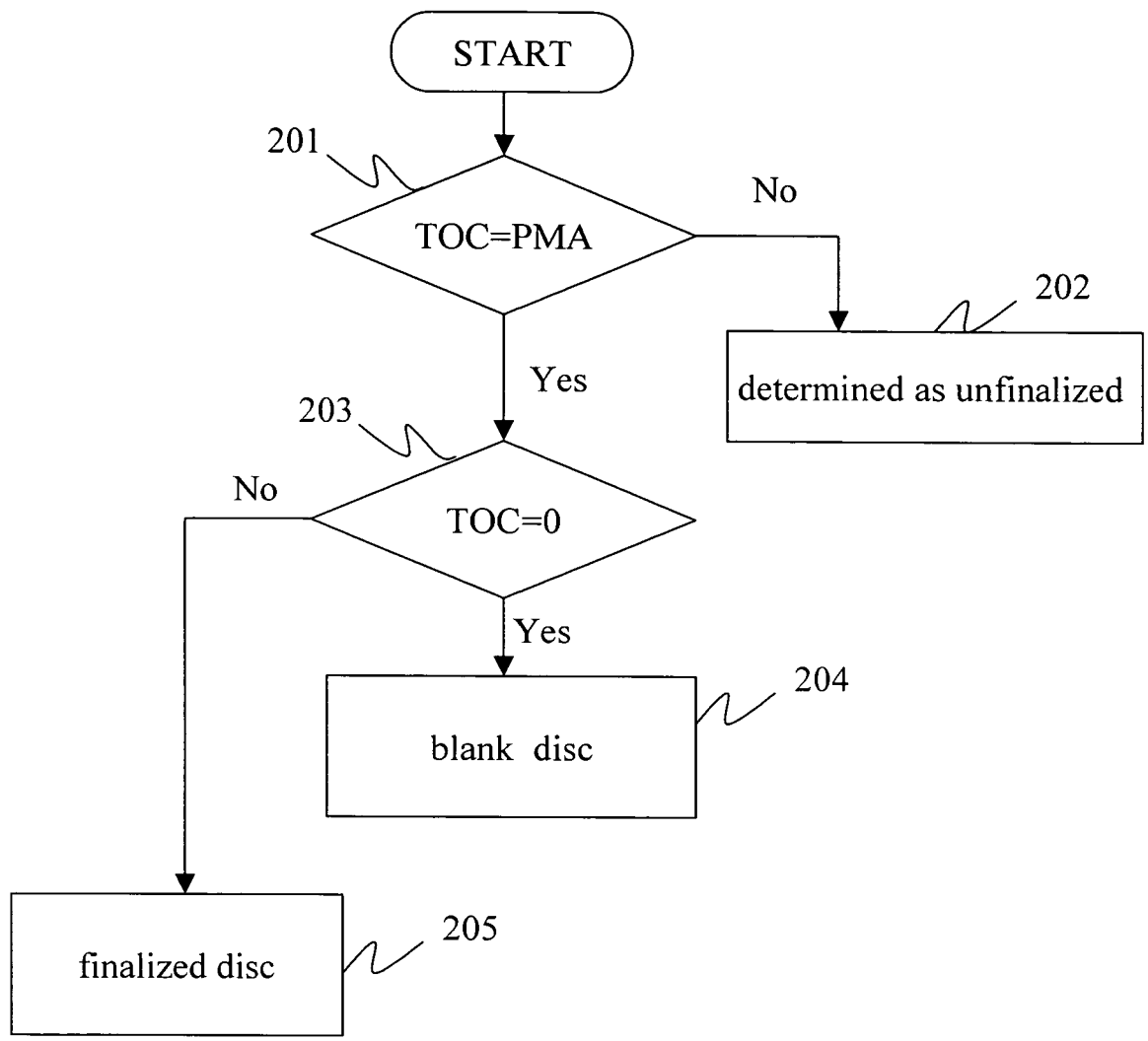
FIG. 2 is a schematic view of steps for determining disc finalization.

The disc type determination method for disc burners, as shown in FIG. 1, is disclosed for unfinalized discs. Therefore, the method first checks whether a disc is unfinalized (step 101). This part is illustrated in FIG. 2. First, the table of contents (TOC) and the program memory area (PMA) of a disc is read out. As shown in the drawing, the method first checks whether the TOC is the same as the PMA (step 201). If they are not the same, the disc is determined as unfinalized (step 202). If they are equal, there are two possibilities. If their value is zero (step 203), the disc is a blank one (step 204) and one can perform normal burning. If it is nonzero, then the disc is finalized (step 205) and thus cannot be further burned.

Figure 3:
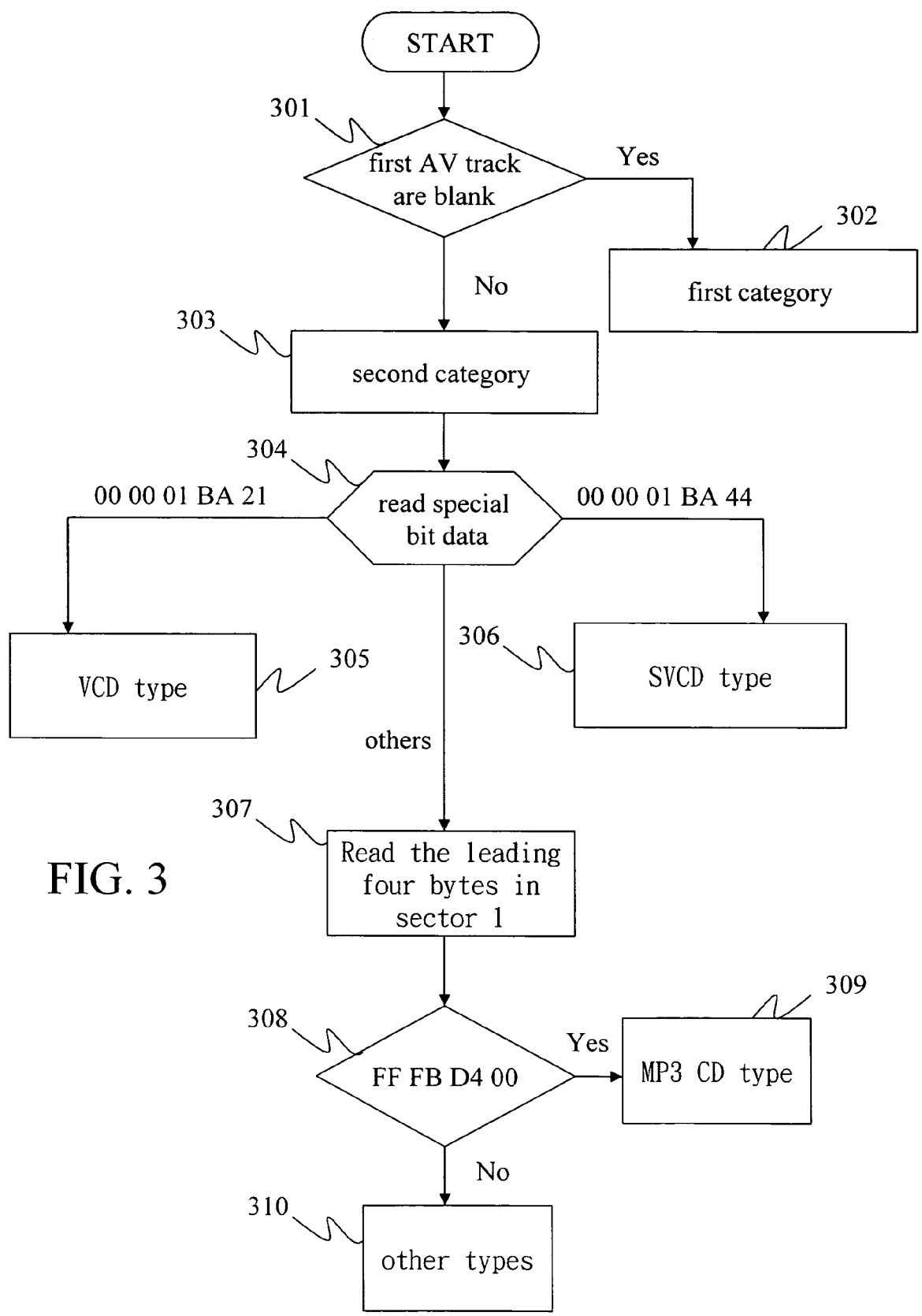
FIG. 3 is a schematic view step for determining the disc type.

Once the disc is confirmed to be an unfinalized one, the method then determines its type. Data in the first track are read (step 102) to classify into two big categories (step 103). The detailed determination method is shown in FIG. 3. First, the method checks whether the data in the first track are blank (step 301). If so, then it is in the first category (step 302); otherwise, it is in the second category (step 303). Among the known types, a disc in the first category is a music CD-DA.

To further determine its type, data in the second track are read out (step 104). The method uses its special data and bit contents to determine its detailed type (step 105). With further reference to FIG. 3, the special bit data being read (step 304) are the leading five bytes in sector 31 of the second track. If the bit data are "00 00 01 BA 21," the disc is determined as the VCD type (step 305). If the bit data are "00 00 01 BA 44," it is determined as the SVCD type. If the bit data are not "00 00 01 BA 21" or "00 00 01 BA 44", we have to further check the leading four bytes in the sector 1 of the second track. (step 307), and determine if they are "FF FB D4 00" (step 308). If yes, the disc is of the MP3 Compact Disc (MP3_CD) type (step 309). If no, it would be the other types (step 310).

After correctly determining the disc type, the user is allowed to enter the data to be burned. After the new burning, the method determines whether the disc should be finalized. If it should be finalized, both the PMA and the TOC have to be updated; otherwise, only the PMA needs to be updated for the next burning.

Certain variations would be apparent to those skilled in the art, which variations are considered within the spirit and scope of the claimed invention.

What is claimed is:

1. A method of determining the type of a disc using a disc burner for determining data stored in an unfinalized disc, comprising the steps of:
   checking whether the disc is unfinalized;
   reading data stored in the first track of the disc;
   classifying the disc according to the data in the first track after reading the data stored in the first track of the disk;
   reading data in the second track; and
   determining the type of the disc according to special data stored in the second track.

2. The method of claim 1, wherein the step of classifying the disc according to the data in the first track determines a disc as in a first category if the data in the first track is blank and in a second category if the data in the first track is not blank.

3. The method of claim 2, wherein the first category is CD-DA.

4. The method of claim 2, wherein the step of reading data in the second track is performed when the disc is determined in the second category.

5. The method of claim 4, wherein the second category includes the video compact disc (VCD) type, the super video compact disc (SVCD) type and MP3 Compact Disc (MP3_CD).

6. The method of claim 5, wherein a disc in the second category is further classified using data stored in sector 31 of the second track.

7. The method of claim 6, wherein the disc is of the video compact disc (VCD) type if the first bits in the sector 31 are "00 00 01 BA 21."

8. The method of claim 6, wherein the disc is of the super video compact disc (SVCD) type if the first bits in the sector 31 are "00 00 01 BA 44."

9. The method of claim 6, wherein the disc is checked the leading four bytes in the sector 1 if the first bits in the sector 31 are not "00 00 01 BA 21" or "00 00 01 BA 44".

10. The method of claim 9, wherein the disc is of the MP3 Compact Disc (MP3_CD) type if the leading four bytes are "FF FB D4 00".

11. The method of claim 1, wherein the special data are stored in sector 31 of the second track.

12. The method of claim 1, wherein the disc is of the video compact disc (VCD) type if the first bits in the sector 31 are "00 00 01 BA 21," and of the super video compact disc (SVCD) type if the first bits in the sector 31 are "00 00 01 BA 44."

13. The method of claim 1, wherein the disc is of the MP3 Compact Disc (MP3_CD) type if the first bits in the sector 31 are not "00 00 01 BA 21" or "00 00 01 BA 44" and the leading four bytes are "FF FB D4 00".

14. The method of claim 1, wherein the step of checking whether the disc is unfinalized further comprises a step of reading a table of contents and a program memory area of the disc to check whether the table of contents is the same as the program memory area.

* * * * *